(12) United States Patent
Portolés Griñán et al.

(10) Patent No.: US 10,612,623 B2
(45) Date of Patent: Apr. 7, 2020

(54) TENSIONING TERMINAL HAVING A PROTECTIVE PROTRUSION

(71) Applicant: SHINY WORKS, S.L., Paiporta (ES)

(72) Inventors: Luis Portolés Griñán, Paiporta (ES); Ricardo VerdúÁlvaro, Paiporta (ES); Luis Marín Mateos-Aparicio, Paiporta (ES)

(73) Assignee: SHINY WORKS, S.L., Paiporta (ES)

( * ) Notice: Subject to any disclaimer, the term of this patent is extended or adjusted under 35 U.S.C. 154(b) by 0 days.

(21) Appl. No.: 16/092,991

(22) PCT Filed: Apr. 4, 2017

(86) PCT No.: PCT/ES2017/070204
§ 371 (c)(1),
(2) Date: Oct. 11, 2018

(87) PCT Pub. No.: WO2017/178676
PCT Pub. Date: Oct. 19, 2017

(65) Prior Publication Data
US 2019/0136943 A1 May 9, 2019

(30) Foreign Application Priority Data
Apr. 13, 2016 (ES) .................................. 201630461

(51) Int. Cl.
*F16G 11/10* (2006.01)
*F16G 11/04* (2006.01)

(52) U.S. Cl.
CPC ............ *F16G 11/108* (2013.01); *F16G 11/04* (2013.01); *F16G 11/10* (2013.01)

(58) Field of Classification Search
CPC ............................... F16G 11/04; F16G 11/108
See application file for complete search history.

(56) References Cited

U.S. PATENT DOCUMENTS 2,033,227 A * 3/1936 Brown .................. A61M 5/315
15/104.33
4,129,927 A * 12/1978 Anderson ............... F16G 11/12
24/136 A (Continued)

FOREIGN PATENT DOCUMENTS

| DE | 3436077 A1 | 4/1986 |
|----|-----------|--------|
| ES | 455221 A1 | 1/1978 |
| ES | 1052858 U | 2/2003 |

OTHER PUBLICATIONS

International Search Report for PCT/ES2017/070204 dated Jun. 14, 2017.

*Primary Examiner* — Robert Sandy
*Assistant Examiner* — David M Upchurch
(74) *Attorney, Agent, or Firm* — Brown & Michaels, PC

(57) ABSTRACT

Terminal turnbuckle having a protective protrusion of the type used for fixing and tensioning filiform elements or the like located between two post-type rigid elements or the like, comprising a solid body (1) housing the elements for retaining the filiform element therein, internally having a channel-like cavity suitable for serving as means for receiving an end portion of a filiform element or the like, allowing the free circulation thereof in one direction, and blocking the movement thereof in the opposite direction, and wherein said solid body (1) has a protrusion (2) in the entry area of the filiform element (3) responsible for protecting said filiform element (3) from the edges present in an opening of the post (4) or the like where the body (1) has been installed.

1 Claim, 4 Drawing Sheets

(56) References Cited

U.S. PATENT DOCUMENTS 4,216,568 A * 8/1980 Anderson .............. F16G 11/12
                                                      24/136 A
6,058,574 A    5/2000 Facey et al.
9,188,193 B2 * 11/2015 Wilson .................... F16G 11/04

* cited by examiner

TENSIONING TERMINAL HAVING A PROTECTIVE PROTRUSION

OBJECT OF THE INVENTION

The object of the present specification is a terminal turnbuckle having a protective protrusion of the type used for tensioning filiform elements between two support points which are configured, for example, in the form of posts or other elements having at least one opening distributed along their length for the filiform element to go through.

The main feature of the terminal turnbuckle herein disclosed lies in the presence of a protective protrusion which is inserted into the openings of the posts or the like, such that it protects the filiform element from possible shear stresses as contact between said filiform element and the edges of the mentioned openings is prevented.

BACKGROUND OF THE INVENTION

A large variety of turnbuckles used in both the industrial sector and the agri-food sector are known today and their function lies in being used (as indicated by its name) for tensioning cables, wires, or other filiform elements.

Spanish utility model ES 1052858 provides an example of this turnbuckle, describing a terminal-type turnbuckle for filiform elements in general, intended for being used for fixing and tensioning filiform elements, wires, or cables located between two rigid elements, such as posts, fences, etc., preventing the wires or the like from twisting, clustering together, or being bent by any means, where the turnbuckle is characterized by being formed from a one-piece body inside which there is incorporated a cover in which there is housed, supported on its inclined bed, a gear wheel on which a spring is supported forcing it to be in contact with the filiform element or wire, the invention incorporating sunken or hollowed-out areas for reducing the weight of the part as a whole, and the cable, filiform element, or wire passing in a longitudinal direction through the inside of the resulting channel.

Similarly, it is known that in the processes of manufacturing posts or other metal elements which have openings for the passage of filiform elements, sharp edges which may cause the filiform elements to break due to contact and continuous friction between them are generated at the borders of said openings. The breaking of the filiform element means a loss of cable, and therefore the replacement thereof, which will generate an economic cost associated with both the material aspect (a new filiform element) and the human aspect (operator performing the installation).

DESCRIPTION OF THE INVENTION

The present invention solves the technical problem of obtaining a tool which can protect the filiform element from the edges of the openings in order to prevent the contact thereof, and therefore the friction or rubbing which will cause it to break. To that end, the terminal turnbuckle having a protective protrusion, object of the present invention, is characterized by comprising a solid body housing the elements for retaining the filiform element therein, internally having a channel-like cavity suitable for serving as means for receiving an end portion of a filiform element or the like, allowing the free circulation thereof in one direction, and blocking the movement thereof in the opposite direction, and characterized in that said solid body has a protrusion in the entry area of the filiform element responsible for protecting said filiform element from the edges present in an opening of the post or the like where the body has been installed.

As a result of its design, the terminal turnbuckle herein disclosed can be used in any type of post or the like intended for the passage of filiform objects, since the shape of its protrusion is adapted to the shape of the openings present in most of said posts, making the use thereof for tensioning filiform elements safer and exponentially increasing its service life since the risk of breaking (in the area of the posts) is exponentially reduced.

An increase in the service life of the filiform element leads to an increase in installation safety as sudden and uncontrolled cuts of the generally metallic filiform element, which may lead to injuries of different severity for the operators or workers handling same, will not occur.

Similarly, preventing the risk of cutting or shearing the filiform element reduces one of the main causes of the replacement of filiform elements in agricultural facilities, which thereby reduces the maintenance cost of said facilities and inexorably results in them being more competitive.

Throughout the description and claims, the word "comprises" and variants thereof do not seek to exclude other technical features, additives, components, or steps. For those skilled in the art, other objects, advantages, and features of the invention will be inferred in part from the description and in part from putting the invention into practice. The following examples and drawings are provided by way of illustration and do not seek to be limiting of the present invention. Furthermore, the present invention covers all the possible combinations of particular and preferred embodiments herein indicated.

BRIEF DESCRIPTION OF THE DRAWINGS

A series of drawings which help to better understand the invention and are expressly related to an embodiment of said invention presented as a non-limiting example thereof is described very briefly below.

PREFERRED EMBODIMENT OF THE INVENTION

Figure 1:
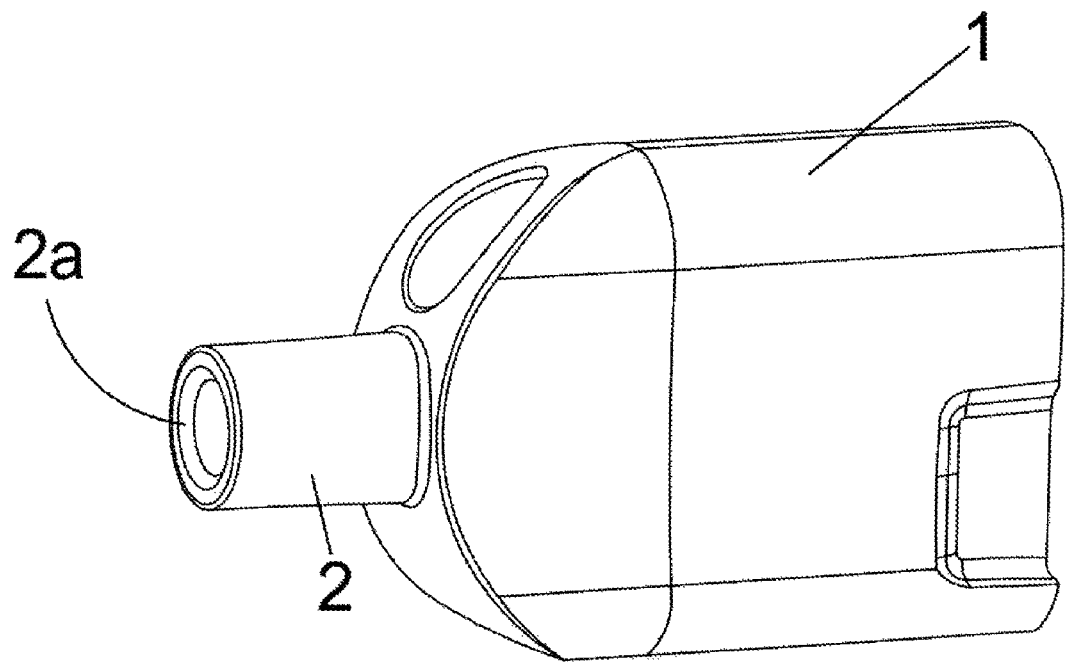
FIG. 1 shows a perspective view of the terminal turnbuckle having a protective protrusion, object of the present invention.
Figure 2:
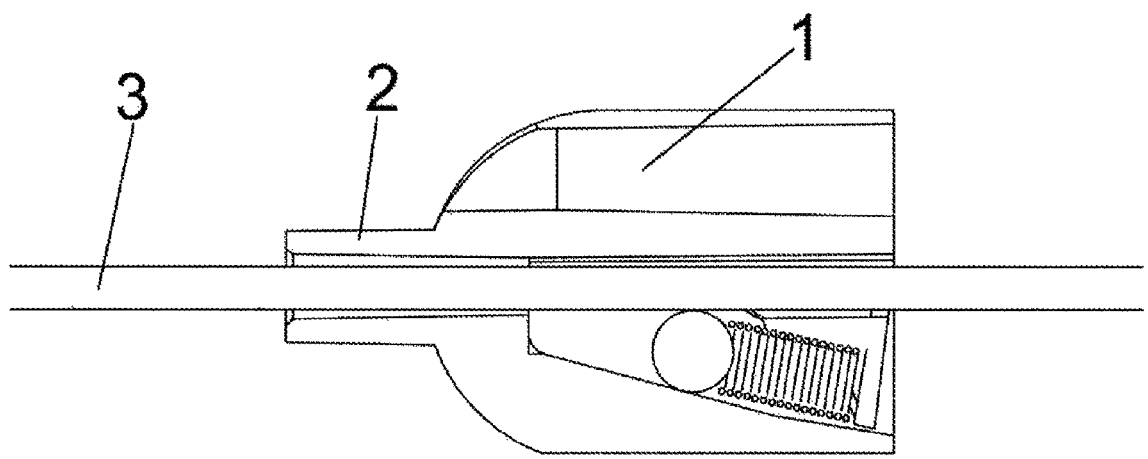
FIG. 2 shows a sectional view of the terminal turnbuckle having a protective protrusion.
Figure 3:
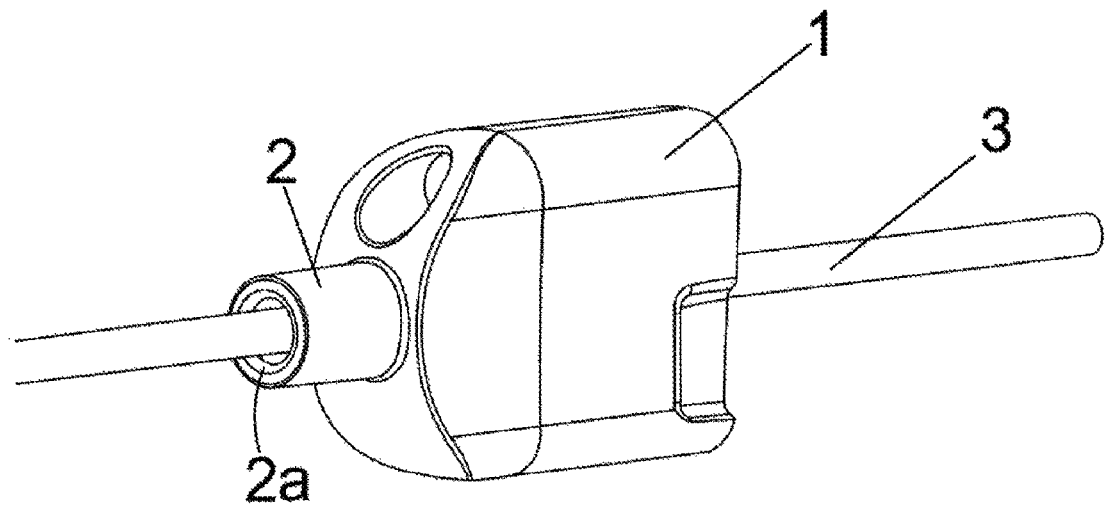
FIG. 3 shows a perspective view of the terminal turnbuckle having a protective protrusion with a filiform element going through it.
Figure 4:
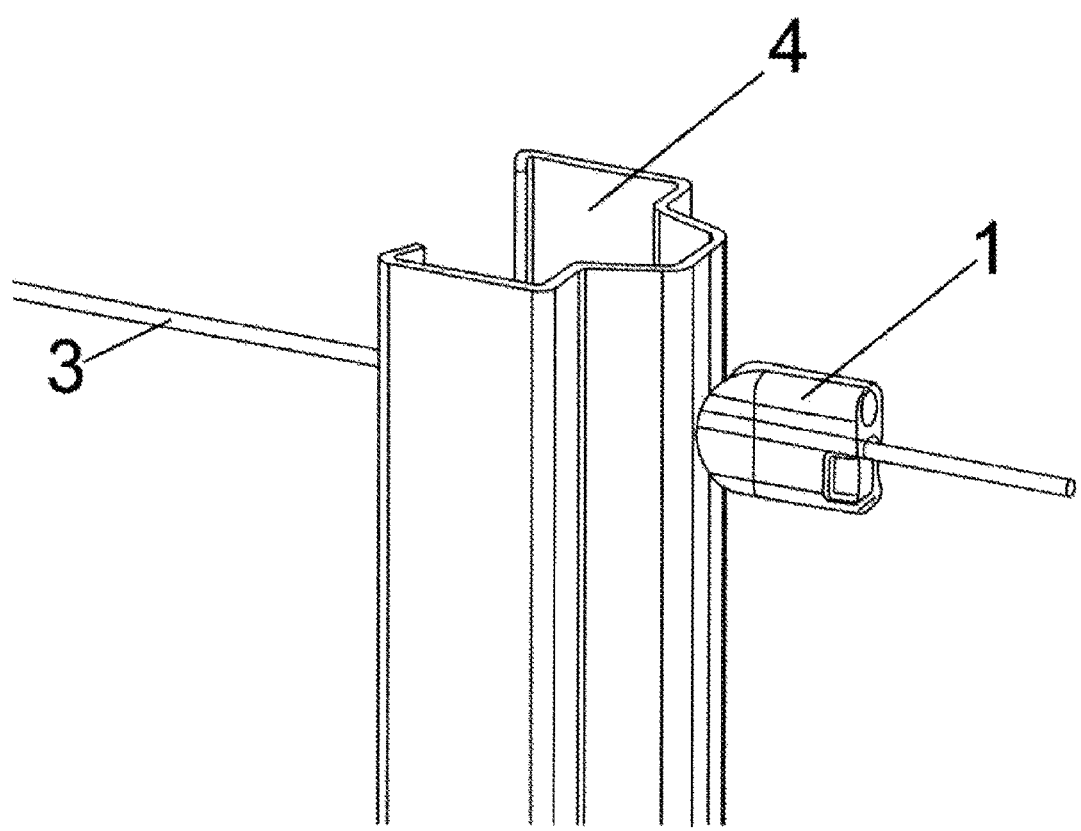
FIG. 4 shows a perspective view of the terminal turnbuckle having a protective protrusion during use.
Figure 5:
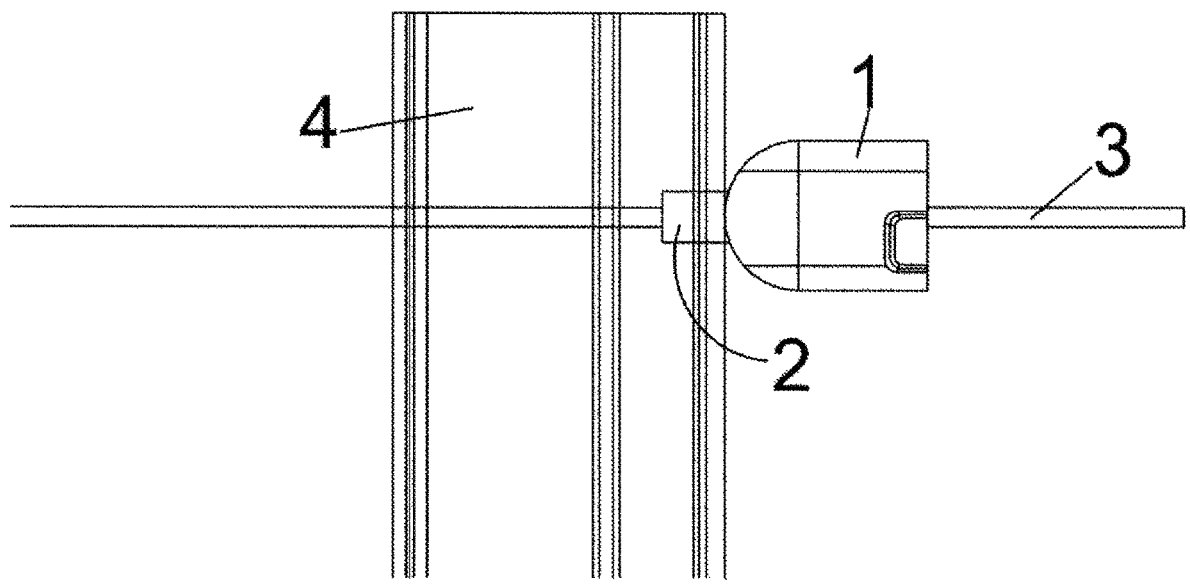
FIG. 5 shows a side view of the terminal turnbuckle having a protective protrusion during use.
Figure 6:
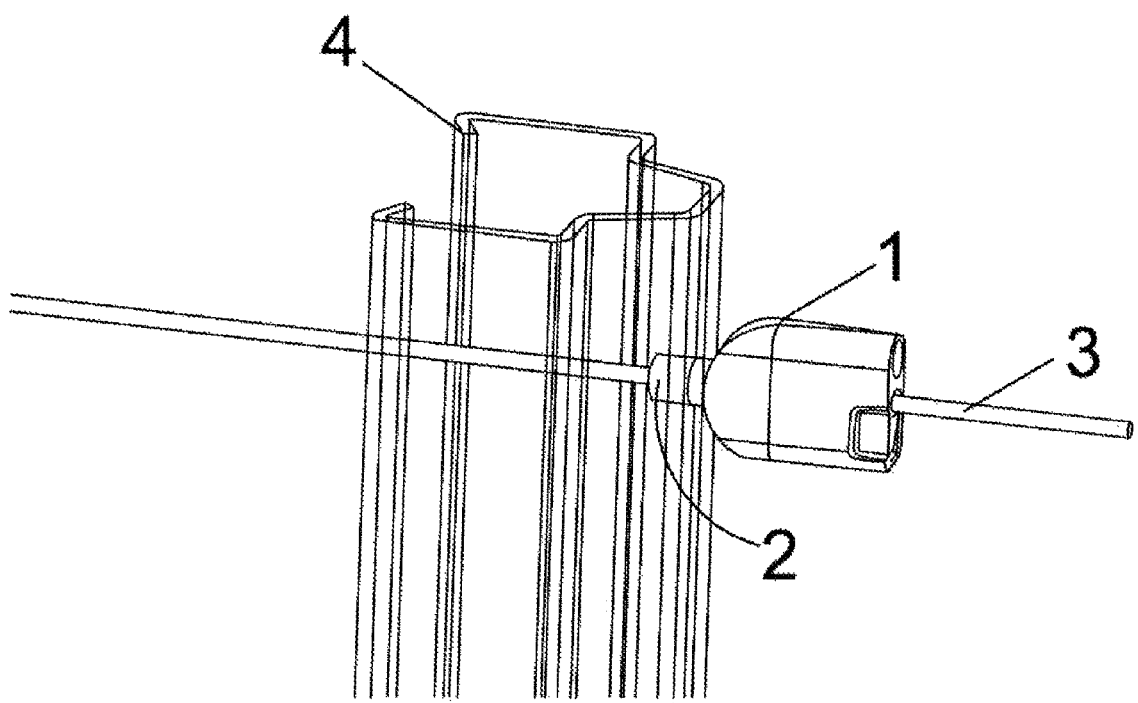
FIG. 6 shows a view of the terminal turnbuckle having a protective protrusion during use, where the manner in which it is inserted into a post can be seen.
Figure 7:
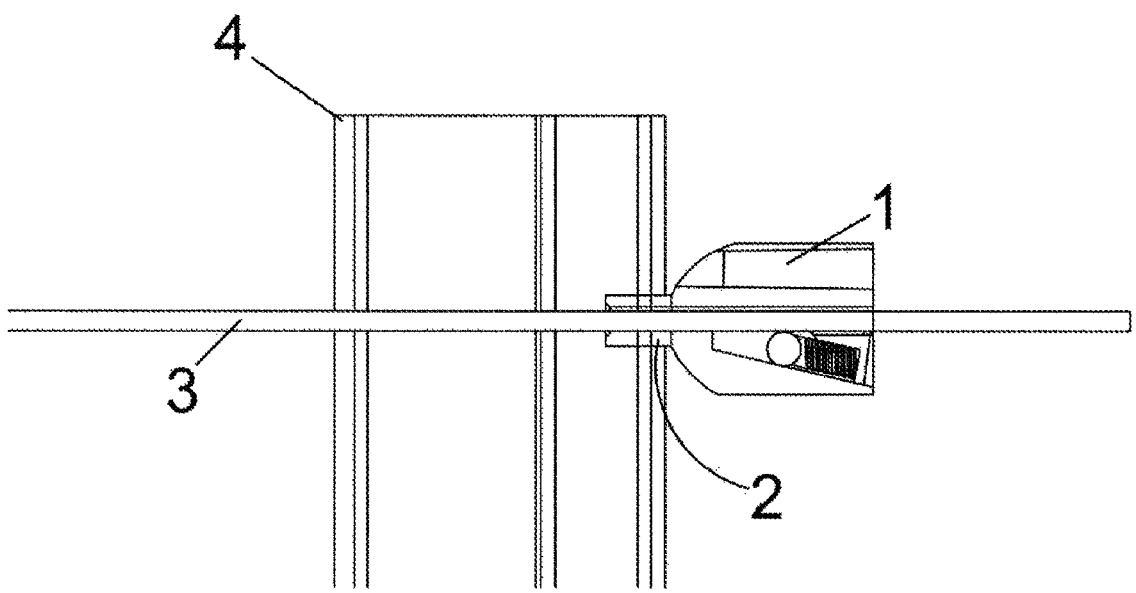
FIG. 7 shows a sectional view of the terminal turnbuckle having a protective protrusion during use.

The attached drawings show a preferred embodiment of the invention. More specifically, the terminal turnbuckle having a protective protrusion, object of the present specification, is formed by a solid body (1) housing therein the elements for retaining the filiform element, such as those described in the model described in the background of the invention.

The body (1) has therein a channel-like cavity suitable for serving as means for receiving an end portion of a filiform element (3) or the like, allowing the free circulation thereof in one direction, and blocking the movement thereof in the opposite direction.

The solid body (1) is characterized by having a protrusion (2) in the entry area of the filiform element (3), which protrusion (2), once said body (1) has been installed in a post (4) or the like through one of the openings present in said post (4), protects the filiform element (3) from possible shearing stresses between the edges present in one of the openings present in the post (4) and the filiform element (3).

To prevent the risk of shearing the filiform element (3), the inner border (2a) of the inlet of the protrusion (2) is rounded.

In a preferred embodiment, the protrusion (2) will have a frustoconical shape such that it can be tightly and gradually inserted into the openings present in the post (4) regardless of the fact that the diameter of the mentioned opening is different from the diameter of the mentioned protrusion (2).

The invention claimed is:

1. A terminal turnbuckle to fix and tension filiform elements located between two post-type rigid elements, the terminal turnbuckle comprising:
   a solid body housing defining
      a channel having an entry and an exit, the channel receiving an end portion of a filiform element, and configured to allow free circulation thereof in one direction, and to block movement thereof in an opposite direction; and
   a protrusion undermountably attached to the entry of the channel of the solid body housing having a frustoconical shape configured to tightly and gradually insert into an opening of the post-type rigid element, wherein the protrusion comprises an inlet having a rounded inner border to prevent shearing of the filiform element when the solid body housing is installed in the post-type rigid element by insertion of the protrusion into an opening of the post-type rigid element.

* * * * *